April 5, 1949. J. L. COONEY 2,466,304
STRAINER
Filed Jan. 28, 1946
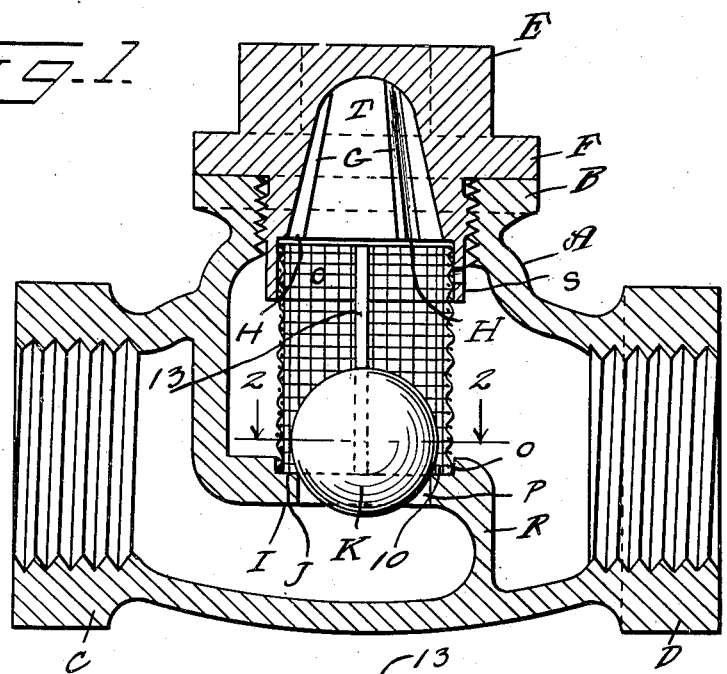
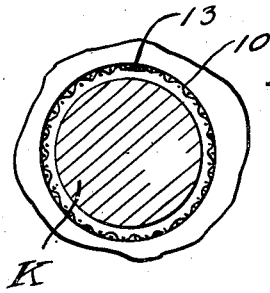
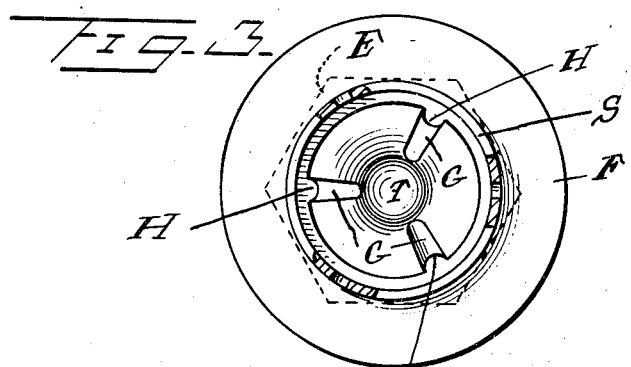
Inventor
J. L. Cooney
By
Kimmel & Crowell Attorneys Patented Apr. 5, 1949

2,466,304

UNITED STATES PATENT OFFICE 2,466,304

STRAINER

John L. Cooney, Erie, Pa.

Application January 28, 1946, Serial No. 643,939

2 Claims. (Cl. 210—166)

The present invention relates to improvements in valves and more particularly to valve strainers and the like.

It is necessary to screen the inlets of valve unions and other valve fittings in order to allow no impurities or foreign matter to filter through into the outlets thereof, as well as to prevent pollution of fluid transmitted from one end of the union to the other. Unless the screen is readily and conveniently removable from the valve fitting in which it is mounted, deterioration of the material of the screen takes place because it is constantly subjected to the line of flow of the fluid through the fitting. Where high pressures are maintained in the valve fittings screened internally damage from deterioration is of frequent occurrence unless the screens can be removed and replaced. Even where removable screens are deposited in valve fittings, should they not be constructed properly with due regard to economical wear and long life, deterioraton is not arrested adequately nor expense saved.

One of the objects of the present invention is to provide a simple, efficient and inexpensive valve strainer which possesses characteristics adapting same for use in valve unions with a minimum subjection to damage due to deterioration influences to which it is exposed. To this end I provide a tubular strainer made from wire mesh screen material, along lines of inexpensive manufacture, that is so shaped, arranged and fitted into a valve fitting as not to expose to the line of flow of fluid therethrough points along its area or surface likely to wear rapidly nor be damaged easily so as to necessitate frequent replacements or substitutions.

Another object thereof is to provide a valve strainer easy to remove, clean and of inexpensive construction and design for the purpose of adding longer life to same and arresting impairment as well.

With the above and other objects in view my invention consists in the combination and arrangement of parts as will be more fully disclosed in the accompanying drawings and specifications, and then more particularly pointed out in the appended claims, but it is to be understood that changes, variations and modifications may be resorted to which fall within the scope of the invention, as claimed.

In the drawings:

Figure 1 is a sectional elevation of a valve fitting showing my invention applied thereto.

Figure 2 is a fragmental view showing the strainer in top plan.

Figure 3 is a bottom plan view of the valve bonnet in which my invention is fitted.

Referring to the drawings, which are merely illustrative of my invention, I disclose the details thereof. The valve union is of conventional design and construction. Its main body portion is designated A, flange B, inlet C, outlet end D, and internal valve supporting wall R. The wall R will preferably be formed with a counterseat O in connection with its flow opening P.

I take wire mesh screen material of approved porosity and shape out the cylindrical hollow strainer by converting a flat piece of wire screen material of suitable dimensions into a tubular body having a length preferably greater than its diameter. The tubular screen body 10 is made with a view to have that particular screen and porosity as will adapt it conveniently to the valve fitting in which it is to be used, considering whether the fluid passing through the fitting is a liquid, or gas, under low or high pressure, hot or cold, etc. The screen material is rolled into cylindrical shape so as to be of uniform diameter throughout its length. The upper and lower or opposite circular edges at the ends of the strainer are left unfinished and ragged to increase frictional purchase between these ends and the parts into which they are fitted. The meeting longitudinal edges of the strainer, however, extending down the full length of the device are constantly subjected to the line of flow of the fluids through the valve fitting, and are thus exposed to corrosive attack and to other deteriorating influences all the time. For this reason I braze or spot weld together these meeting edges in such a manner that the metal seam 13 extends coextensively with the length of the strainer, presents flush surfaces on opposite sides of the strainer where the meeting edges of the material are jointed together, and completely surrounds the edges thereof so as to conceal them from view, so that these edges are lost therein. At the same time the metal seam continues the truly cylindrical cross section of the tubular strainer.

In operation, the strainer is made adaptive not only to the internal formation of the valve fitting, but also to the valve bonnet connected thereto. This part is shown to consist of the stem S, collar-shaped in construction, the intermediate flange F and the nut-shaped head E, while a counterseat therein is formed collectively by the lower ends H of a series of circumferentially spaced apart ribs G, formed upon the internal conical-shaped member or chamber T of the bonnet. The stem S is externally screw-threaded so as to be adjustably united with the internally threaded surface of the flanged part of the valve fitting. The lower shoulder-like ends H of the ribs G terminate short of the outer end of the stem. In the event the ball K should be moved up close to the recess T, it will engage the edge H of the ribs which hold the lower end of the recess open to prevent the ball from becoming wedged in the recess and to permit the free movement of the ball K and the discharge of fluid through the recess is at all times assured.

The tubular strainer has its inner circular edge fitted with a slight press fit into the counterseat in the bonnet below the shoulder ends H of the ribs G. The cylindrical cross section thereof will be snugly embraced by the wall of the stem S, and in this manner the circular edges of the wire mesh material of the screen is protected from direct contact with the fluid introduced into the valve fitting. This is the way in which this end of the strainer is removably centered in the bonnet. The strainer being thus supported in pendant relation in the bonnet with its major length extending there-beyond, the bonnet is screwed home into the valve union until its flange F abuts the flange B of the fitting. As the bonnet is threaded downwardly into the body A of the fitting, it carries the strainer along with it and ultimately deposits the lower circular edge of the strainer in the annular counterseat of the seat P of the valve, where same is protected against direct contact with fluids. The ball valve K, closing the opening P, fits snugly in the strainer. The strainer is removable from the valve seat when the bonnet is removed from the fitting, and then the strainer may also be removed from the bonnet.

I claim:

1. A valved strainer comprising a body having horizontally aligned inlet and outlet ports, a horizontal valve seat in said body between said ports, a bonnet in said body above said valve seat, said valve seat formed with a coaxial counterseat thereabout, said bonnet formed with an upwardly extending conical recess therein having a counterbore about the lower edge thereof, a valve ball engaging in said valve seat on the side thereof which is down stream with respect to the path of flow, and a strainer element about said ball, the ends of said strainer element engaging in the counterseat of said valve seat and said bonnet.

2. A valved strainer comprising a body having horizontally aligned inlet and outlet ports, a horizontal valve seat in said body between said ports, a bonnet in said body above said valve seat, said valve seat formed with a coaxial counterseat thereabout, said bonnet formed with an upwardly extending conical recess therein having a counterbore about the lower edge thereof, said recess formed with axially disposed circumferentially spaced apart ribs communicating with said counterbore therein, a valve ball engaging in said valve seat on the side thereof which is down stream with respect to the path of flow, and a strainer element about said ball, the ends of said strainer element engaging in the counterseat of said valve seat and said bonnet.

JOHN L. COONEY.

REFERENCES CITED

The following references are of record in the file of this patent:

UNITED STATES PATENTS

| Number | Name | Date |
|---|---|---|
| 730,356 | Emond | June 9, 1903 |
| 1,115,784 | Cranwell et al. | Nov. 3, 1914 |
| 1,169,792 | French | Feb. 1, 1916 |
| 1,274,940 | Sage | Aug. 6, 1918 |
| 1,722,804 | Kleinlercher | July 30, 1929 |
| 2,031,589 | Burckhalter et al. | Feb. 25, 1936 |
| 2,183,616 | Korte | Dec. 19, 1939 |
| 2,404,621 | Davis | July 23, 1946 |